Patented May 5, 1931

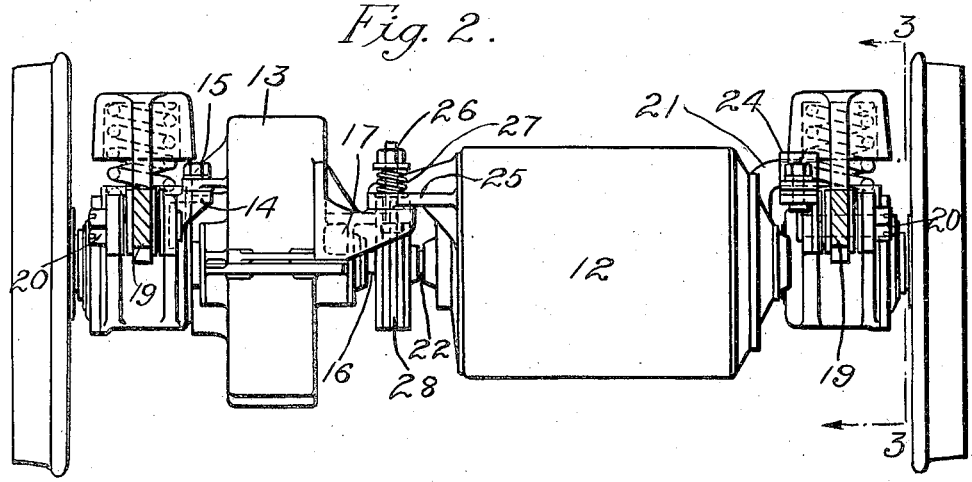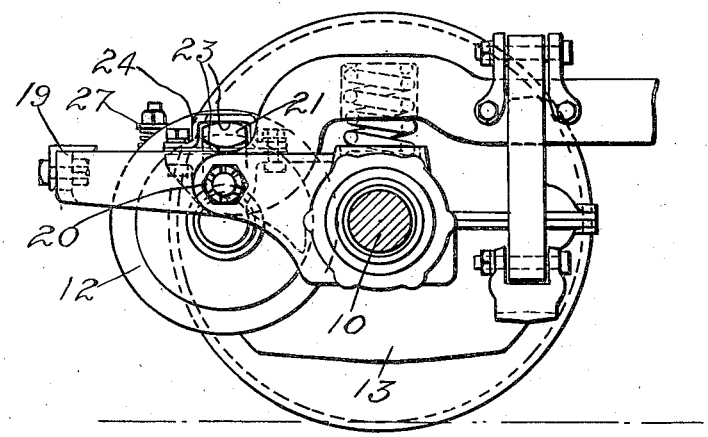

1,804,351

UNITED STATES PATENT OFFICE

ELMER LATSHAW, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA

MOTOR MOUNTING FOR CAR TRUCKS

Application filed March 6, 1930. Serial No. 433,686.

This invention relates to car trucks, and more particularly to a mounting for the drive motors of the trucks of electric cars.

An important object of the invention is the provision of a motor mounting permitting the motors to be suspended outwardly of the axles of the car, which will eliminate, insofar as possible, tendency to deflection or displacement between the motor and the driving connection to the adjacent axle.

A further object of the invention is to provide a mounting of this character which will permit the motor to be readily inserted and removed.

A still further object of the invention is the provision of a mounting of this character which may be readily incorporated in car trucks of the character illustrated in my prior patent No. 1,763,434, granted June, 1930, for car trucks.

These and other objects I attain by the construction shown in the accompanying drawings wherein, for the purpose of illustration, I have shown a preferred embodiment of my invention and wherein:

Fig. 2 is an end elevation of the truck, the end cross member being broken away; and Fig. 3 is a side elevation of the truck, the adjacent wheel being removed.

Figure 1:
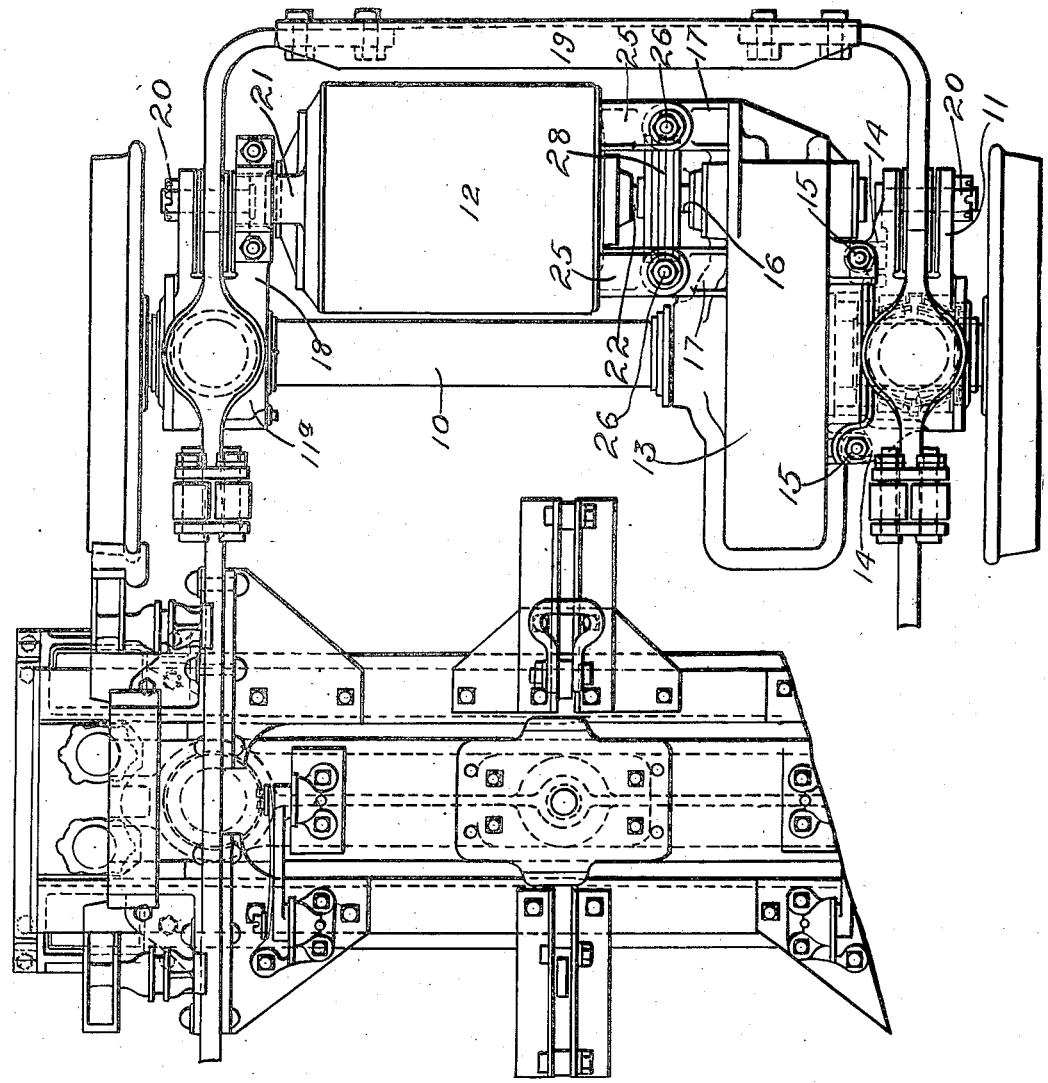
Fig. 1 is a top plan view of one end of a car truck embodying a drive and motor mounting constructed in accordance with my invention.

Referring now more particularly to the drawings, the numeral 10 generally designates the axles of a car truck; 11 and 11—a, journal boxes therefor; 12, a driving motor for the axle; and 13, a housing for reduction gearing connecting the motor and axle.

In accordance with my invention, the journal box 11 is provided with lugs 14 to which the transmission housing 13 is directly secured through bolts 15. The input shaft 16 of this housing parallels the driving axle 10 and at opposite sides of the input shaft, and at that side of the casing facing the journal box 11—a, is equipped with outstanding ears 17. The journal box 11—a is equipped with a wing 18 which may constitute one side member of the arm supporting this journal box, connecting this journal box to the frame. Each of the journal boxes 11 and 11—a is connected to the corresponding side frame member 19 through an outwardly-extending arm pivotally connected to the frame at 20, in accordance with the directions of the application hereinbefore mentioned. It is not essential, however, that the specific journal box mounting herein illustrated be employed, as the outwardly-extending wing 18 may be produced upon journal boxes of the conventional type if desired.

The motor 12, and more particularly the end frame thereof adjacent the journal box 11—a, is provided with a nose 21 resting upon the wing 18 and spaced sufficiently from the axis of the motor shaft 22 to place the corresponding end of the motor shaft in axial alignment with the input shaft 16. The under and upper surfaces of this nose are preferably slightly arcuately curved as at 23 and the nose straddled by a keeper plate 24 bolted to the wing 18 at its ends, and having an offset central portion affording space for the reception of the nose. The opposite end of the motor casing has projecting ears 25 to rest upon and be supported by the ears 17 of the transmission housing 13 these ears being connected with the ears 17 by through bolts 26 and being resiliently yieldably maintained in engagement therewith by springs 27 surrounding such bolts. A flexible coupling 28 connects the input shaft 16 of the transmission with the motor shaft 22. The ears 25 maintain the adjacent end of the motor shaft 22 in axial alignment so that under normal conditions complete axial alignment of the motor shaft and input shaft will be maintained. Twisting movements resulting from unequal depression of opposite sides of the truck frame will be taken care of through the rounded nose 21 and through the flexible connection provided by the mounting of the ears 25 upon the ears 17. The motor being disposed at the end of the truck, is readily accessible for removal and replacement and is so situated that an extremely short wheel base may be provided and at the same time a low over-all clearance may be had, thus particularly adapting the truck for use on street railway cars where short turns and low mounting are essential. Since the motor is, in effect, carried from the arms of the journal boxes at the pivotal connection thereof to the frame, the effect is that of supporting the motor from and for movement with the frame, and the springs of the journal boxes thus serve to cushion jars which would otherwise be imparted to the motor in the same manner in which they cushion these jars as imparted to the frame.

As the construction is capable of a considerable modification without in any manner departing from the spirit of my invention, I do not wish to be understood as limiting myself thereto except as hereinafter claimed.

I claim:

1. In a car truck, the combination with a drive axle of journal boxes therefor, a transmission upon the axle including a housing carried by the axle and secured to one of said journal boxes, the transmission including an input shaft, a motor having the armature shaft thereof connected to said input shaft, and means supporting the motor from said transmission housing and from the other of the journal boxes normally maintaining the motor shaft in axial alignment with the input shaft of the transmission.

2. In a car truck, the combination with a drive axle of journal boxes therefor, a transmission upon the axle including a housing carried by the axle and secured to one of said journal boxes, and a drive for the transmission comprising a motor having its shaft paralleling the axle, said motor supported between said transmission housing and one of said journal boxes.

3. In a car truck, the combination with a drive axle of journal boxes therefor, a transmission upon the axle including a housing carried by the axle, a drive motor having its shaft paralleling the axle, and means supporting the drive motor from said transmission and one of said journal boxes.

4. In a car truck, the combination with a drive axle of journal boxes therefor, a transmission upon the axle including a housing carried by the axle and one of said journal boxes, a drive motor having its shaft paralleling the axle, and means supporting the drive motor from said transmission and one of said journal boxes, a flexible connection between the drive motor and the input shaft of the transmission, the supporting connections between the motor and said transmission and journal box being yieldable.

5. In a car truck, the combination with a drive axle of journal boxes therefor, a transmission upon the axle including an input shaft paralleling the axle and disposed outwardly thereof, an outwardly-extending wing upon one of said journal boxes, a housing for the transmission and a motor normally axially aligned with said input shaft and supported from said transmission housing and the wing of said journal box.

6. In a car truck, the combination with a drive axle of journal boxes therefor, a transmission upon the axle including an input shaft paralleling the axle and disposed outwardly thereof, an outwardly-extending wing upon one of said journal boxes, a housing for the transmission and a motor normally axially aligned with said input shaft and supported from said transmission housing and the wing of said journal box, the supporting means for the motor engaging the transmission housing and said wing permitting oscillation of the motor with relation thereto and a flexible connection between the motor shaft and the input shaft of the transmission.

7. In a car truck, an axle, journal boxes therefor, a transmission carried by the axle including an input shaft paralleling the axle and disposed outwardly thereof with respect to the truck bolster, a housing for the transmission supported from one of said journal boxes, an outwardly-extending wing on the other of said journal boxes, the motor having a nose pivotally supported from said wing, a flexible connection between the motor and the transmission casing and a flexible driving connection between the motor shaft and said input shaft.

8. In a car truck, an axle, journal boxes therefor, a transmission carried by the axle including an input shaft paralleling the axle and disposed outwardly thereof with respect to the truck bolster, a housing for the transmission supported from one of said journal boxes, an outwardly-extending wing on the other of said journal boxes, the motor having a nose pivotally supported from said wing, a flexible connection between the motor and the transmission casing and a flexible driving connection between the motor shaft and said input shaft, the connection between the transmission housing and the motor comprising co-acting supporting ears thereon, bolts connecting said ears and springs about the bolts normally maintaining the ears in engagement with one another.

9. In a car truck, the combination with a drive axle of a driving connection therefor, comprising a motor having its shaft in substantial parallelism to the axle and disposed outwardly therefrom with respect to the truck bolster, journal boxes for the axle, means operatively supporting one end of the motor from one of said journal boxes and means operatively supporting the opposite end of the motor from the axle and the other of the journal boxes.

10. In a car truck, the combination with a drive axle of a driving connection therefor, comprising a motor having its shaft in substantial parallelism to the axle and disposed outwardly therefrom with respect to the truck bolster, journal boxes for the axle, means operatively supporting one end of the motor from one of said journal boxes, means operatively supporting the opposite end of the motor and mounted about the axle and an operative connection between the other of the journal boxes and the last-named means preventing rotation of said last-named means about or with the axle.

11. In a car truck, a driving axle, journal boxes therefor having outwardly-extending arms, a truck frame to which the arms are pivotally attached, a motor disposed outwardly of and substantially parallel to the axle, a transmission to connect the motor and the axle, and means to support the motor from the truck frame comprising an arm of one of said journal boxes at one end and a case for said transmission and the arm of the other of the journal boxes at the opposite end.

12. In a car truck, a driving axle, journal boxes therefor having outwardly extended arms, a truck frame to which the ends of the arms are pivoted, springs interposed between the journal boxes and the frame, a motor disposed outwardly of and substantially parallel to the axle, a transmission connecting the motor and the axle, means directly supporting one end of the motor from one of said journal box arms and means operatively supporting the opposite end of the motor from the arm of the other journal box.

13. In a car truck, a driving axle, journal boxes therefor having outwardly extended arms, a truck frame to which the ends of the arms are pivoted, springs interposed between the journal boxes and the frame, a motor disposed outwardly of and substantially parallel to the axle, a transmission connecting the motor and the axle, means directly supporting one end of the motor from one of said journal box arms and means operatively supporting the opposite end of the motor from the arm of the other journal box, including said transmission.

ELMER LATSHAW.